US012046107B2

(12) United States Patent
Eubanks et al.

(10) Patent No.: US 12,046,107 B2
(45) Date of Patent: *Jul. 23, 2024

(54) GAMING MACHINES WITH FREE PLAY BONUS MODE PRESENTING ONLY WINNING OUTCOMES

(71) Applicant: Video Gaming Technologies, Inc., Franklin, TN (US)

(72) Inventors: Mark Daniel Eubanks, Mechanicsville, VA (US); Sarah Jean Gozdecki, Des Plaines, IL (US); Steve Nicodemus, Charlottesville, VA (US); Richard Kerr Sisson, Charlottesville, VA (US); Jeremy Michael Webb, Stanardsville, VA (US)

(73) Assignee: Video Gaming Technologies, Inc., Brentwood, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,068

(22) Filed: Jun. 2, 2023

(65) Prior Publication Data

US 2023/0306821 A1 Sep. 28, 2023

Related U.S. Application Data

(63) Continuation of application No. 17/892,674, filed on Aug. 22, 2022, now Pat. No. 11,769,374, which is a (Continued)

(51) Int. Cl.
*G07F 17/32* (2006.01)

(52) U.S. Cl.
CPC ........ *G07F 17/3267* (2013.01); *G07F 17/326* (2013.01); *G07F 17/3269* (2013.01)

(58) Field of Classification Search
CPC .... G07F 17/32; G07F 17/326; G07F 17/3267; G07F 17/3269
See application file for complete search history.

(56) References Cited

U.S. PATENT DOCUMENTS

| | | | |
|---|---|---|---|
| 5,971,849 | A | 10/1999 | Falciglia |
| 6,146,271 | A | 11/2000 | Kadlic |

(Continued)

FOREIGN PATENT DOCUMENTS

| | | | |
|---|---|---|---|
| AU | 2004202643 | B2 | 1/2005 |
| AU | 2007231800 | B2 | 5/2012 |

(Continued)

OTHER PUBLICATIONS

Notice of Allowance dated Jun. 4, 2020 for U.S. Appl. No. 16/100,851 (pp. 1-7).

(Continued)

*Primary Examiner* — Chase E Leichliter
(74) *Attorney, Agent, or Firm* — Armstrong Teasdale LLP

(57) ABSTRACT

A gaming machine includes a processor and a presentation device coupled to the processor. The processor is programmed to determine that a free play trigger condition is satisfied, and to execute one or more free plays based on the free play trigger condition to create one or more free play outcomes. Each free play outcome is a winning free play outcome or a non-winning free play outcome. The presentation device is configured to present winning free play outcomes when at least one free play outcome is a winning free play outcome. Non-winning free play outcomes are not presented.

20 Claims, 4 Drawing Sheets

Related U.S. Application Data continuation of application No. 17/347,279, filed on Jun. 14, 2021, now Pat. No. 11,423,744, which is a continuation of application No. 16/841,337, filed on Apr. 6, 2020, now Pat. No. 11,043,075, which is a continuation of application No. 13/090,859, filed on Apr. 20, 2011, now Pat. No. 10,614,666.

(56) References Cited

U.S. PATENT DOCUMENTS 6,234,897 B1 5/2001 Frohm
6,299,165 B1 10/2001 Nagano
6,582,305 B1 6/2003 Carter
6,626,758 B1 9/2003 Parham
7,052,395 B2 5/2006 Glavich
7,097,560 B2 * 8/2006 Okada ................. G07F 17/3209 463/20
7,166,028 B2 1/2007 Fasbender
7,300,351 B2 * 11/2007 Thomas .............. G07F 17/3262 463/19
7,632,184 B2 12/2009 Gauselmann
7,704,137 B2 4/2010 Englman
7,740,245 B2 6/2010 Tarantino
7,749,072 B1 7/2010 Singer
7,846,018 B2 12/2010 Baerlocher
7,938,719 B2 5/2011 Fasbender
7,993,195 B2 8/2011 Belger
8,287,367 B2 10/2012 Hall
8,323,094 B2 12/2012 Palermo
8,454,429 B2 6/2013 Jaffe
8,506,380 B2 8/2013 Hughes
8,506,386 B2 8/2013 Harris
8,696,436 B2 * 4/2014 Acres .................. G07F 17/3272 463/31
8,708,806 B2 4/2014 Wabschall
9,017,160 B2 4/2015 Moroney
9,064,383 B2 6/2015 Palermo
9,728,043 B2 8/2017 Acres
9,959,708 B2 5/2018 Caputo
10,614,666 B2 * 4/2020 Eubanks ............. G07F 17/3267
11,043,075 B2 * 6/2021 Eubanks ............... G07F 17/326
11,423,744 B2 * 8/2022 Eubanks ............. G07F 17/3267
11,769,374 B2 * 9/2023 Eubanks ............. G07F 17/3269 463/25
2002/0010016 A1 * 1/2002 Tsukahara ........... G07F 17/3244 463/20
2002/0086725 A1 7/2002 Fasbender
2002/0155880 A1 10/2002 Glavich
2003/0032470 A1 * 2/2003 Weiss .................. G07F 17/3265 463/16
2003/0060276 A1 * 3/2003 Walker ................ G07F 17/3244 463/25
2003/0064797 A1 * 4/2003 Jackson .................. G07F 17/32 463/16
2003/0114217 A1 * 6/2003 Walker ................ G07F 17/3262 463/20
2003/0125100 A1 7/2003 Cannon
2003/0236118 A1 * 12/2003 Okada ................. G07F 17/3227 463/20
2004/0023709 A1 * 2/2004 Beaulieu ................. G07F 17/32 463/16
2004/0033827 A1 2/2004 Gilmore
2004/0053666 A1 3/2004 Vancura
2004/0082384 A1 4/2004 Walker
2004/0087360 A1 5/2004 Chamberlain
2004/0242320 A1 12/2004 Jackson
2004/0259627 A1 * 12/2004 Walker .................... G07F 17/34 463/20
2004/0266516 A1 * 12/2004 Thomas .................. G07F 17/32 463/20
2005/0060050 A1 3/2005 Baerlocher
2005/0075156 A1 4/2005 Seelig
2005/0075163 A1 4/2005 Cuddy
2005/0153769 A1 7/2005 Casey
2005/0187005 A1 8/2005 Rose
2006/0068903 A1 * 3/2006 Walker ................ G07F 17/3244 463/25
2006/0079313 A1 4/2006 Trainor
2006/0111172 A1 * 5/2006 Walker ................ G07F 17/3213 463/16
2006/0199634 A1 9/2006 Anderson
2006/0223632 A1 * 10/2006 Walker ................ G07F 17/3244 463/25
2006/0244211 A1 * 11/2006 Osawa ................ G07F 17/3244 463/20
2006/0247006 A1 * 11/2006 Inamura ................ G07F 17/323 463/20
2006/0247007 A1 * 11/2006 Inamura ................ G07F 17/323 463/20
2007/0167211 A1 7/2007 Rodgers
2007/0202943 A1 8/2007 Thomas
2007/0293297 A1 * 12/2007 Schugar .................. G07F 17/32 463/20
2008/0102916 A1 * 5/2008 Kovacs ............... G07F 17/3211 463/16
2008/0108431 A1 5/2008 Cuddy
2008/0113734 A1 5/2008 Watkins
2008/0113777 A1 * 5/2008 Anderson ........... G07F 17/3244 463/25
2008/0318656 A1 * 12/2008 Walker ................ G07F 17/3262 463/20
2009/0017897 A1 1/2009 Fujimoto
2009/0124332 A1 * 5/2009 Baerlocher ............. G07F 17/32 463/20
2009/0124346 A1 * 5/2009 Baerlocher ......... G07F 17/3258 463/20
2009/0197664 A1 * 8/2009 Schultz ................... G07F 17/32 463/18
2009/0200740 A1 8/2009 Falciglia, Sr.
2009/0239601 A1 9/2009 Macke
2009/0275387 A1 * 11/2009 Yoshizawa .......... G07F 17/3244 463/20
2010/0029364 A1 2/2010 Zielinski
2010/0056248 A1 * 3/2010 Acres ...................... G07F 17/34 463/20
2010/0120492 A1 5/2010 Davis
2010/0120525 A1 * 5/2010 Baerlocher ............. G07F 17/32 463/29
2010/0124971 A1 5/2010 Baerlocher
2010/0137056 A1 6/2010 Hoffman
2011/0045892 A1 2/2011 Vann
2011/0059791 A1 * 3/2011 Tarantino ................ G07F 17/32 463/22
2011/0118001 A1 5/2011 Vann
2011/0118006 A1 * 5/2011 Acres .................. G07F 17/3288 463/31
2011/0124400 A1 5/2011 Scholtz
2011/0130198 A1 * 6/2011 Van Linden ........ G07F 17/3244 463/27
2011/0244935 A1 10/2011 Matthews
2011/0269548 A1 * 11/2011 Barclay ............... G07F 17/3274 463/43
2012/0034967 A1 * 2/2012 Owen ..................... G07F 17/34 463/31
2012/0061150 A1 3/2012 Coulombe
2012/0122543 A1 * 5/2012 Watkins .............. G07F 17/3262 463/20
2012/0157195 A1 * 6/2012 Sum .................... G07F 17/3267 463/29
2012/0172108 A1 * 7/2012 Acres .................. G07F 17/3267 463/20
2012/0172130 A1 * 7/2012 Acres .................. G07F 17/3225 463/42
2012/0270638 A1 * 10/2012 Eubanks ............. G07F 17/3269 463/25
2013/0005446 A1 1/2013 Englman
2013/0065663 A1 3/2013 Johnson
2013/0065665 A1 3/2013 Watkins
2013/0157756 A1 6/2013 Hall
2014/0087829 A1 3/2014 Watkins
2014/0094303 A1 4/2014 Wabschall

(56) References Cited

U.S. PATENT DOCUMENTS

| | | | | |
|---|---|---|---|---|
| 2014/0179396 | A1 | 6/2014 | Aoki | |
| 2014/0221071 | A1 | 8/2014 | Calio | |
| 2014/0302909 | A1 | 10/2014 | Meyer | |
| 2014/0342802 | A1 | 11/2014 | Itagaki | |
| 2014/0349732 | A1 | 11/2014 | Pawloski | |
| 2015/0018070 | A1 | 1/2015 | Meyer | |
| 2015/0045106 | A1 | 2/2015 | You | |
| 2015/0087382 | A1 | 3/2015 | Gilbertson | |
| 2015/0221176 | A1 | 8/2015 | Meyer | |
| 2015/0228163 | A1 | 8/2015 | Clarebrough | |
| 2015/0302482 | A1 | 10/2015 | Vagner | |
| 2015/0356813 | A1 | 12/2015 | Mead | |
| 2015/0379809 | A1 | 12/2015 | Clarebrough | |
| 2016/0049050 | A1 | 2/2016 | Berman | |
| 2016/0358412 | A1 | 12/2016 | Eaton | |
| 2017/0024970 | A1 | 1/2017 | Sherrets | |
| 2017/0032609 | A1 | 2/2017 | Inamura | |
| 2017/0032611 | A1 | 2/2017 | Luong | |
| 2017/0092071 | A1 | 3/2017 | Cuddy | |
| 2017/0124805 | A1 | 5/2017 | Prabhu | |
| 2017/0178460 | A1 | 6/2017 | Berman | |
| 2017/0301175 | A1 | 10/2017 | Acres | |
| 2017/0301177 | A1 | 10/2017 | Pawloski | |
| 2019/0318579 | A1 | 10/2019 | Marsh | |
| 2020/0265681 | A1* | 8/2020 | Eubanks | G07F 17/3267 |
| 2020/0265682 | A1* | 8/2020 | Eubanks | G07F 17/3267 |
| 2021/0312762 | A1* | 10/2021 | Eubanks | G07F 17/3269 |
| 2022/0406142 | A1* | 12/2022 | Eubanks | G07F 17/326 |
| 2023/0306821 | A1* | 9/2023 | Eubanks | G07F 17/3269 |

FOREIGN PATENT DOCUMENTS

| | | | |
|---|---|---|---|
| AU | 2011285816 | B2 | 4/2015 |
| AU | 2016234913 | A1 | 4/2017 |
| JP | 2016202587 | A | 12/2016 |

OTHER PUBLICATIONS

Office Action dated Oct. 28, 2020 for U.S. Appl. No. 16/841,290 (pp. 1-17).
Notice of Allowance dated Sep. 25, 2020 for U.S. Appl. No. 16/100,851 (pp. 1-5).
Notice of Allowance dated Sep. 3, 2020 for U.S. Appl. No. 15/951,802 (pp. 1-8).
Office Action dated Feb. 4, 2021 for U.S. Appl. No. 16/841,290 (pp. 1-8).
Notice of Allowance dated Feb. 24, 2021 for U.S. Appl. No. 16/841,290 (pp. 1-9).
Office Action dated Jan. 25, 2021 for U.S. Appl. No. 16/841,337 (pp. 1-11).
Office Action dated Feb. 5, 2021 for U.S. Appl. No. 16/122,592 (pp. 1-9).
Australian Examination Report No. 1 for App. No. AU2016234913, dated Feb. 9, 2021, 4 pages.
Notice of Allowance dated Apr. 28, 2021 for U.S. Appl. No. 16/122,592 (pp. 1-9).
Notice of Allowance dated Feb. 24, 2021 for U.S. Appl. No. 16/841,337 (pp. 1-9).
Office Action (Non-Final Rejection) dated Apr. 14, 2022 for U.S. Appl. No. 17/347,279 (pp. 1-8).
Office Action (Non-Final Rejection) dated Sep. 10, 2021 for U.S. Appl. No. 17/069,564 (pp. 1-11).
Office Action (Non-Final Rejection) dated Feb. 8, 2022 for U.S. Appl. No. 17/091,740 (pp. 1-14).
Office Action (Notice of Allowance and Fees Due (PTOL-85)) dated Mar. 24, 2022 for U.S. Appl. No. 17/069,564 (pp. 1-9).
Office Action (Non-Final Rejection) dated Mar. 24, 2022 for U.S. Appl. No. 17/104,390 (pp. 1-6).
Office Action (Notice of Allowance and Fees Due (PTOL-85)) dated May 10, 2022 for U.S. Appl. No. 17/347,279 (pp. 1-8).
Office Action (Notice of Allowance and Fees Due (PTOL-85)) dated Jun. 17, 2022 for U.S. Appl. No. 17/104,390 (pp. 1-8).
Office Action (Notice of Allowance and Fees Due (PTOL-85)) dated Jul. 7, 2022 for U.S. Appl. No. 17/091,740 (pp. 1-5).
Office Action (Non-Final Rejection) dated Apr. 27, 2023 for U.S. Appl. No. 17/892,674 (pp. 1-9).
Australian Examination Report No. 1 issued in App. No. AU2022200674, dated Dec. 20, 2022, 4 pages.
Office Action (Non-Final Rejection) dated Feb. 16, 2023 for U.S. Appl. No. 17/872,947 (pp. 1-6).
Office Action (Notice of Allowance and Fees Due (PTOL-85)) dated Apr. 5, 2023 for U.S. Appl. No. 17/872,947 (pp. 1-8).
Office Action (Notice of Allowance and Fees Due (PTOL-85)) dated Jun. 14, 2023 for U.S. Appl. No. 17/892,674 (pp. 1-8).
Office Action (Notice of Allowance and Fees Due (PTOL-85)) dated Jun. 26, 2023 for U.S. Appl. No. 17/409,440 (pp. 1-8).
Office Action (Non-Final Rejection) dated Sep. 28, 2023 for U.S. Appl. No. 18/048,337 (pp. 1-7).
Office Action (Notice of Allowance and Fees Due (PTOL-85)) dated Dec. 21, 2023 for U.S. Appl. No. 18/048,337 (pp. 1-5).
Australian Examination Report No. 1 issued in App. No. AU2019202557, dated Jan. 24, 2024, 3 pages.

* cited by examiner

GAMING MACHINES WITH FREE PLAY BONUS MODE PRESENTING ONLY WINNING OUTCOMES

CROSS REFERENCE TO RELATED APPLICATIONS

This application is a continuation of and claims priority to U.S. patent application Ser. No. 17/892,674, filed Aug. 22, 2022, which is a continuation of U.S. patent application Ser. No. 17/347,279, now U.S. Pat. No. 11,423,744, filed Jun. 14, 2021, which is a continuation of U.S. patent application Ser. No. 16/841,337, now U.S. Pat. No. 11,043,075, filed Apr. 6, 2020, which is a continuation of U.S. patent application Ser. No. 13/090,859, now U.S. Pat. No. 10,614,666, filed Apr. 20, 2011, the contents and disclosures of which are incorporated by reference herein in their entireties.

BACKGROUND

The embodiments described herein relate generally to gaming machines and, more particularly, to systems and methods for presenting winning free play outcomes while not presenting non-winning free play outcomes.

At least some known gaming machines provide a base game and a bonus game. For example, a bonus game may include free plays that are associated with a probability of a payout and do not require a player to deposit money or credits to the gaming machine. A bonus game may be triggered by a condition, such as a particular combination of symbols associated with a base play outcome in the base game.

Executing free plays creates free play outcomes, which may be winning (e.g., associated with a payout) or non-winning. At least some known gaming machines present both winning and non-winning free play outcomes to the player. Such gaming machines may further present a free play bonus mode and then create and present each free play outcome in the free play bonus mode. Such gaming machines may create an expectation of a winning free play outcome in the player a sense of disappointment when a free play bonus mode results in no winning free play outcomes, potentially discouraging further play at the gaming machine.

BRIEF DESCRIPTION

In one aspect, a gaming machine includes a processor and a presentation device coupled to the processor. The processor is programmed to determine that a free play trigger condition is satisfied, and to execute one or more free plays based on the free play trigger condition to create one or more free play outcomes. Each free play outcome is a winning free play outcome or a non-winning free play outcome. The presentation device is configured to present the winning free play outcomes when at least one free play outcome is a winning free play outcome. The non-winning free play outcomes are not presented.

In another aspect, a method is provided for use with a gaming machine. The method includes determining, by the gaming machine, that a free play trigger condition is satisfied. One or more free plays are executed by the gaming machine based on the free play trigger condition to create one or more free play outcomes. Each free play outcome is a winning free play outcome or a non-winning free play outcome. The winning free play outcomes are presented by the gaming machine when at least one free play outcome is a winning free play outcome. The non-winning free play outcomes are not presented.

In yet another aspect, a gaming system includes a gaming server and a gaming machine coupled in communication with the gaming server. The gaming server is configured to determine that a free play trigger condition is satisfied, and to transmit a free play notification indicating that the free play trigger condition is satisfied to one or more gaming machines. The gaming machine is configured to execute one or more free plays based on the free play notification to create one or more free play outcomes. Each free play outcome is a winning free play outcome or a non-winning free play outcome. The gaming machine is also configured to present the winning free play outcomes when at least one free play outcome is a winning free play outcome. The non-winning free play outcomes are not presented.

DETAILED DESCRIPTION

Exemplary embodiments of systems and methods for use in presenting only winning outcomes of free plays on a gaming machine (e.g., free spins on a mechanical or electronic reel game) are described herein. Such embodiments may enhance an entertainment aspect of the game by suppressing the display of non-winning free play outcomes, which may be perceived as a negative experience by the player. Furthermore, when free play outcomes are presented in a free play bonus mode, free plays may be executed prior to displaying the bonus mode, and the free play bonus mode may be entirely suppressed if none of the free plays produce a winning outcome.

Exemplary technical effects of systems and methods described herein include at least one of: (a) determining that a free play trigger condition is satisfied; (b) executing one or more free plays based on the free play trigger condition to create one or more free play outcomes, wherein each free play outcome is a winning free play outcome or a non-winning free play outcome; (c) presenting winning free play outcomes when at least one free play outcome is a winning free play outcome, wherein non-winning free play outcomes are not presented; (d) presenting a free play bonus mode when at least one free play outcome is a winning free play outcome, wherein the winning free play outcomes are presented in the free play bonus mode; and (e) presenting the winning free play outcomes in a sequence that is based on payouts associated with the winning free play outcomes.

Figure 1:
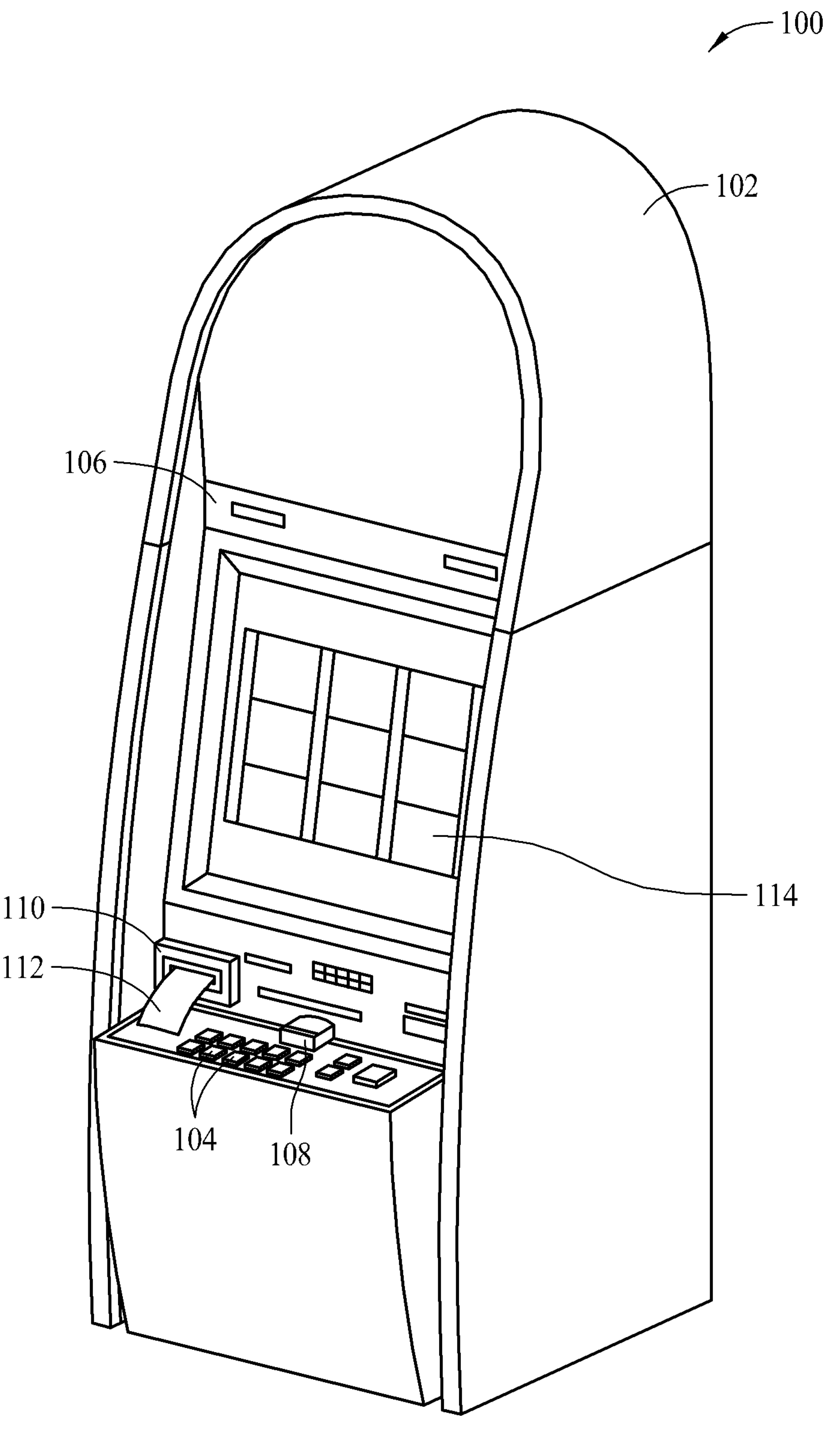
FIG. 1 is a schematic diagram of an exemplary gaming machine.

FIG. 1 is a schematic diagram of an exemplary gaming machine 100 that facilitates presenting winning free play outcomes and suppressing non-winning free play outcomes. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a cabinet 102 configured to house a plurality of components, such as a gaming machine controller, peripheral devices, presentation devices, and player interaction devices. For example, in an exemplary embodiment, gaming machine 100 includes a plurality of switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112. Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more presentation devices 114. Presentation devices 114 are mounted to cabinet 102, and may include a primary presentation device for displaying a primary game and a secondary presentation device for displaying a secondary or bonus game. Presentation devices 114 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user.

In an exemplary embodiment, presentation device 114 is used to display one or more game image, symbols and indicia such as a visual representation or exhibition of movement of an object such as a mechanical, virtual, or video reel, dynamic lighting, video images, and the like. In an alternative embodiment, presentation device 114 displays images and indicia using mechanical means. For example, presentation device 114 may include an electromechanical device, such as one or more rotatable reels, to display a plurality of game or other suitable images, symbols, or indicia.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator (RNG), a pseudo-random number generator (PNG), or any other suitable randomization process.

Figure 2:
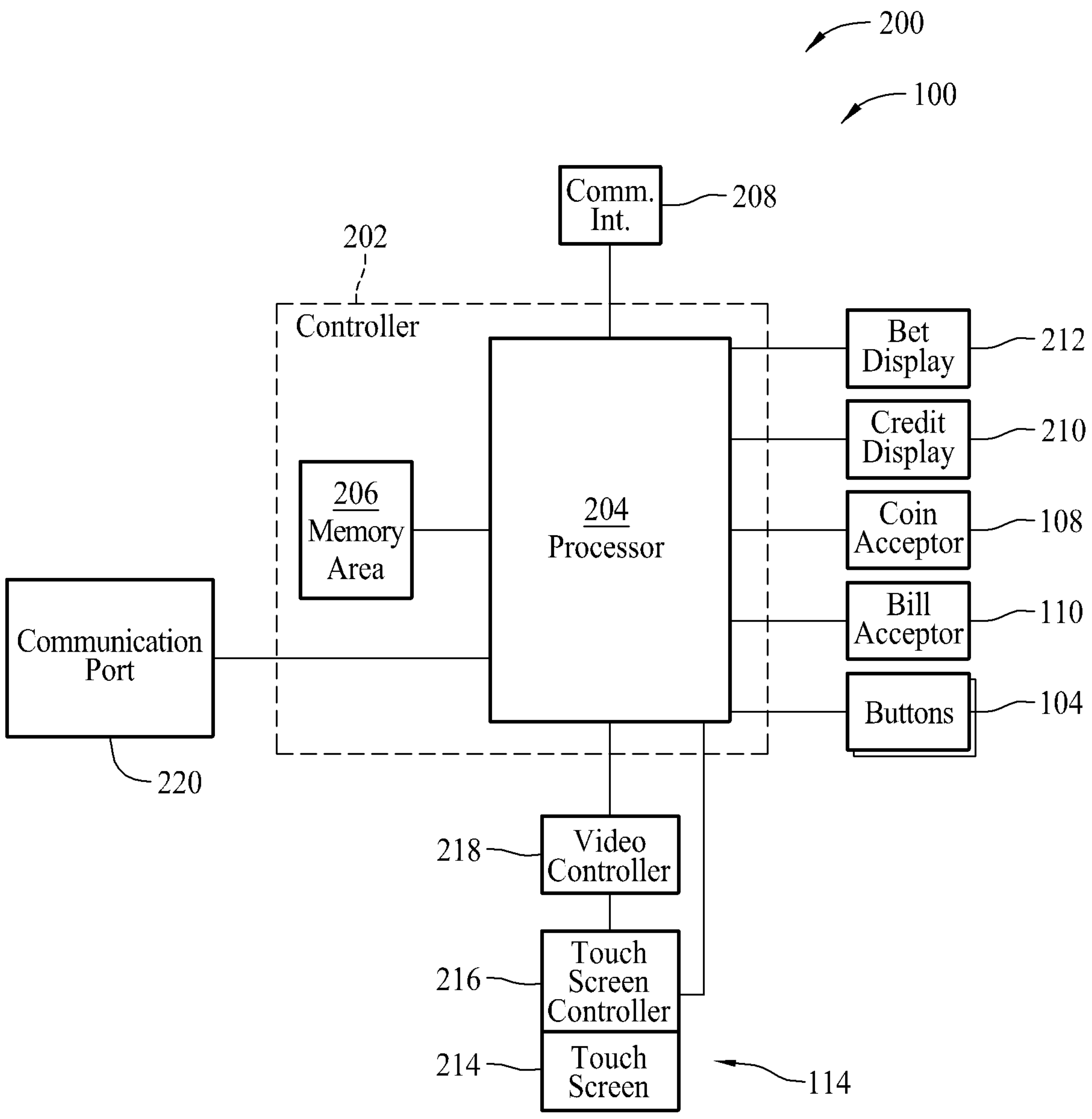
FIG. 2 is a schematic block diagram of an exemplary electrical architecture that may be used with the gaming machine shown in FIG. 1.

FIG. 2 is a schematic block diagram of an exemplary electrical architecture 200 that may be used with gaming machine 100. In the exemplary embodiment, gaming machine 100 includes a gaming machine controller 202 having a processor 204 communicatively coupled a memory area 206. Moreover, in the exemplary embodiment, processor 204 and memory area 206 reside within cabinet 102 (shown in FIG. 1) and may be collectively referred to herein as a "computer" or "controller." Gaming machine 100 is configurable and/or programmable to perform one or more operations described herein by programming processor 204. For example, processor 204 may be programmed by encoding an operation as one or more executable instructions and providing the executable instructions in memory area 206.

Controller 202 communicates with one or more other gaming machines 100 or other suitable devices via a communication interface 208. Processor 204 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 206 stores program code and instructions, executable by processor 204, for controlling gaming machine 100. For example, memory area 206 stores data such as image data, event data, player input data, random or pseudo-random number generation software, pay table data, and/or other information or applicable game rules that relate to game play on gaming machine 100. Moreover, memory area 206 may include one or more forms of memory. For example, memory area 206 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 206 by itself or in combination.

In the exemplary embodiment, gaming machine 100 includes a credit display 210, which displays a player's current number of credits, cash, account balance or the equivalent. Gaming machine 100 also includes a bet display 212 which displays a player's amount wagered. Credit display 210 and bet display 212 may be standalone displays independent of presentation device 114, or credit display 210 and bet display 212 may be incorporated into presentation device 114.

Moreover, in an exemplary embodiment, presentation device 114 is controlled by controller 202. In some embodiments, presentation device 114 includes a touch screen 214 and an associated touch screen controller 216. A video controller 218 is communicatively coupled to controller 202 and touch screen controller 216 to enable a player to input game play decisions into gaming machine 100 via touch screen 214. Furthermore, gaming machine 100 includes one or more communication ports 220 that enable controller 202 to communicate with external peripheral devices (not shown) such as, but not limited to, external video sources, expansion buses, game or other displays, a SCSI port, or a key pad.

Furthermore, and in the exemplary embodiment, controller 202 is programmed to execute one or more free plays when one or more free play trigger conditions are satisfied, and to present winning free play outcomes while suppressing non-winning free play outcomes. For example, when at least one free play outcome is associated with a payout, controller 202 may cause presentation device 114 to present a free play bonus mode (e.g., a red screen) and to present each winning free play outcome in the free play bonus mode. Conversely, if all free play outcomes are non-winning, controller 202 may suppress display of the free play bonus mode.

Figure 3:
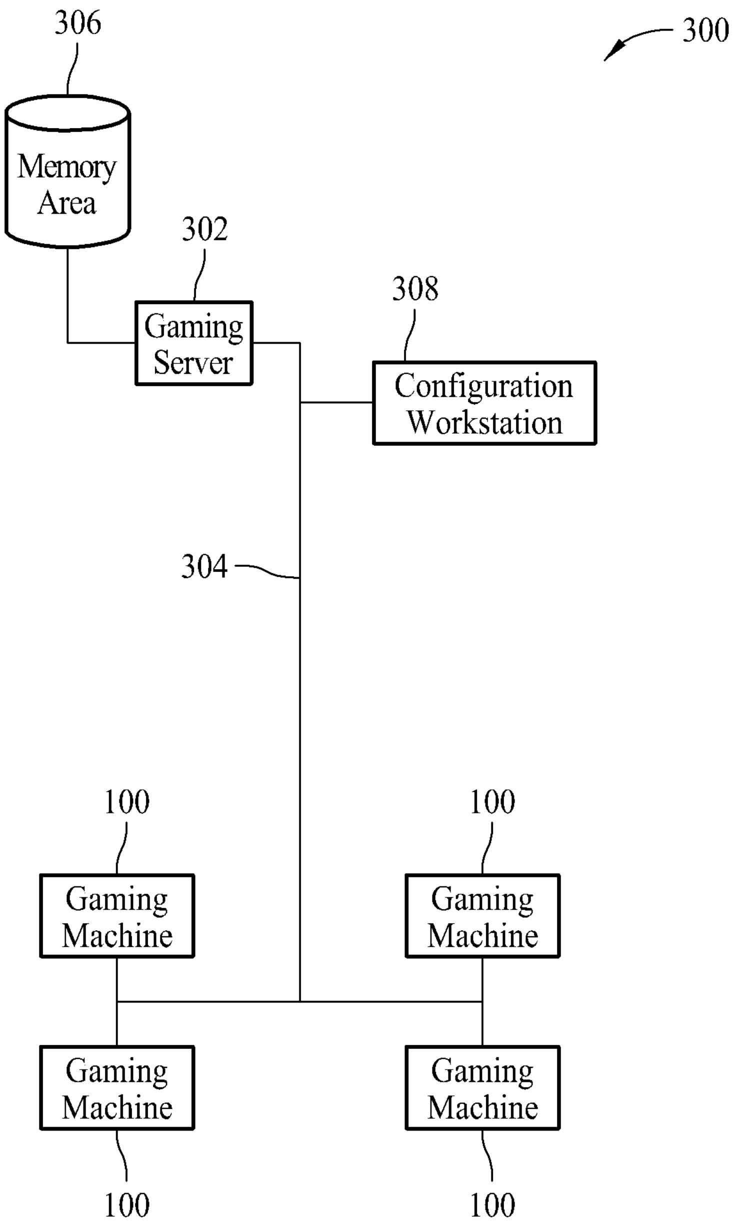
FIG. 3 is a block schematic diagram of an exemplary gaming system that includes a plurality of gaming machines shown in FIG. 1.

FIG. 3 is a block schematic diagram of an exemplary gaming system 300 that includes a plurality of gaming machines 100. Each gaming machine 100 is coupled via communication interface 208 to one or more servers, such as a gaming server 302, using a network 304. Gaming server 302 includes a processor (not shown) that facilitates data communication between each gaming machine 100 and other components of gaming system 300. Such data is stored in, for example, a memory area 306, such as a database, that is coupled to gaming server 302.

As described above, gaming machines 100 may include video bingo machines, video poker machines, video slot machines, and/or other similar gaming machines that implement alternative games. Moreover, gaming machines 100 may be terminal-based machines, wherein the actual games, including random number generation and/or outcome determination, are performed at gaming server 302. In such an embodiment, gaming machine 100 displays results of the game via presentation device 114 (shown in FIGS. 1 and 2).

Moreover, in the exemplary embodiment, gaming system 300 includes a configuration workstation 308 that includes a user interface that enables an administrator to set up and/or to modify portions of gaming system 300 and/or gaming server 302. Gaming server 302 may perform a plurality of functions including, for example, game outcome generation, player tracking functions, and/or accounting functions. However, in alternative embodiments, gaming system 300 may include a plurality of servers that separately perform these functions and/or any suitable function for use in a network-based gaming system. In some embodiments, gaming server 302 controls bonus applications or bonus systems that award bonus (e.g., base play bonuses and/or free plays) opportunities on gaming system 300. Moreover, gaming server 302 may include a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

Moreover, in some embodiments, gaming server 302 tracks data of players using gaming machines 100, and also controls elements (e.g., messages and/or bonus modes) that appear on presentation device 114 of gaming machines 100. For example, gaming server 302 can store physical characteristics of players, such as, but not limited to, the player age. Gaming server 302 can also store data related to the players and tracked using player tracking identification, such as a player card. Moreover, gaming server 302 can store information and data about the player such as loyalty points, player address, phone number, and/or any information that may be retrieved and transmitted to gaming machines 100. In some embodiments, gaming server 302 stores and tracks information such as, but not limited to, the average amount of wager played at gaming machine 100. Moreover, gaming server 302 can track an average amount of wagers by the player, any funds the player may have in an account, and data relating to reportable events. Such data is associated with individual players and logged using a taxable accrual log.

Figure 4:
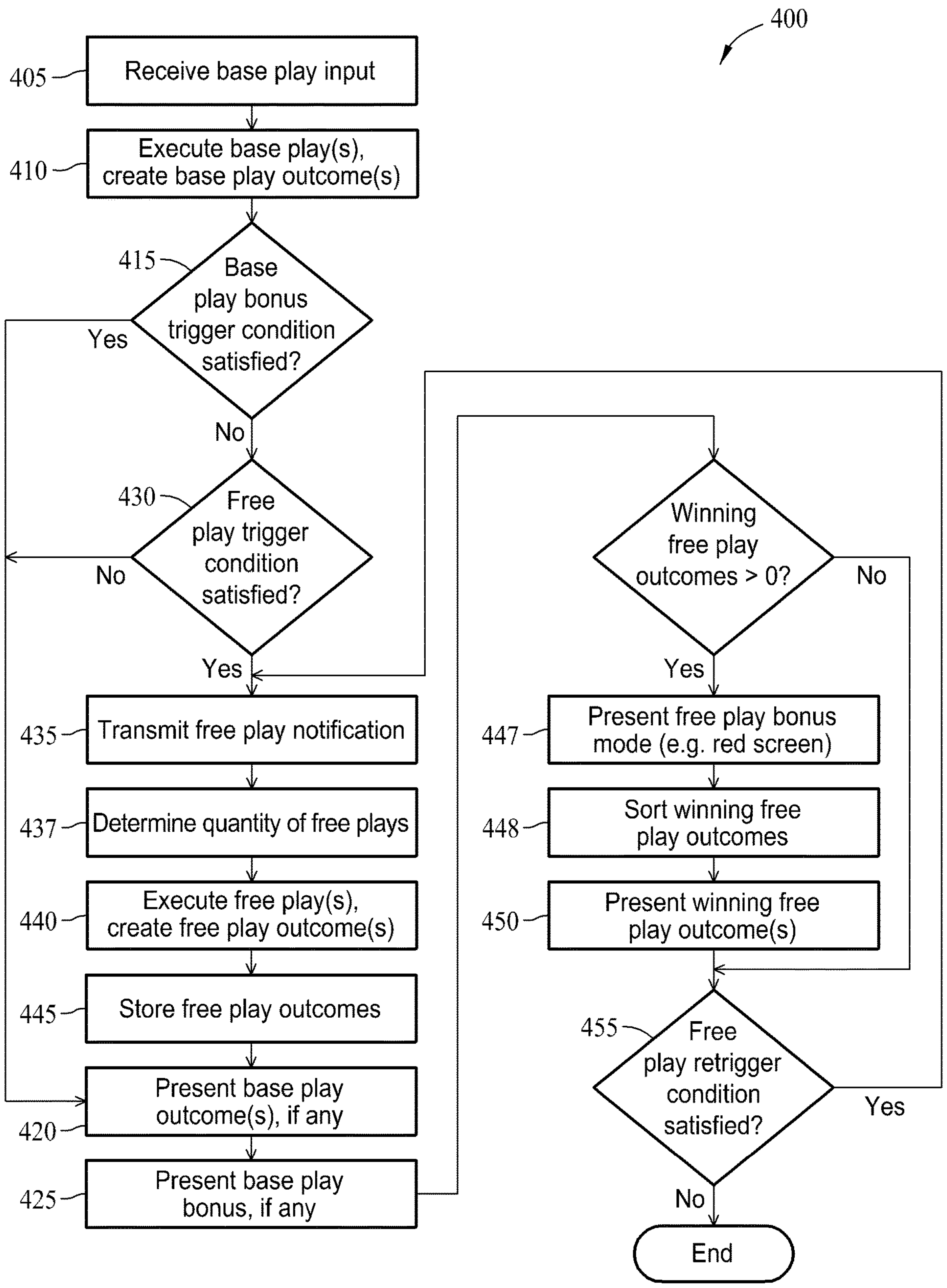
FIG. 4 is a flowchart that illustrates an exemplary method for presenting free play outcomes during game play at the gaming machine shown in FIG. 1.

FIG. 4 is a flowchart 400 that illustrates an exemplary method for presenting free play outcomes during game play at gaming machine 100 (shown in FIGS. 1 and 2). Referring to FIGS. 2 and 4, in the exemplary embodiment, while presenting a non-bonus, or "base," game, controller 202 receives 405 a base play input (e.g., via a button 104 and/or presentation device 114). For example, the base play input may include a bet and/or a start play action.

Controller 202 executes 410 one or more base plays, creating base play outcomes that each correspond to an executed base play. In exemplary embodiments, executing 410 a base play includes selecting a combination of game symbols (e.g., using an RNG or a PNG) and determining whether the selected combination is associated with a payout based on a base play pay table.

In the exemplary embodiment, controller 202 determines 415 whether a base play bonus trigger condition is satisfied. If so, controller 202 presents 420 the base play outcome(s) and presents 425 the base play bonus.

Otherwise, based on determining 415 that no base play bonus trigger condition is satisfied, controller 202 determines 430 whether one or more free play trigger conditions are satisfied. In some embodiments, a free play trigger condition is satisfied whenever controller 202 determines 415 that no base play bonus trigger condition is satisfied. In addition, or alternative to, controller 202 may determine 430 that a free play trigger condition is satisfied by generating a random number (e.g., using an RNG or a PNG) and determining that the random number is within a predetermined range. As another example, controller 202 may determine 430 that a free play trigger condition is satisfied by determining that a base play outcome is associated with a predetermined symbol combination. As a further example, controller 202 may determine 430 that a free play trigger condition is satisfied by determining that the quantity of credits (e.g., money) deposited in gaming machine 100 exceeds a predetermined "coin-in" threshold value. The coin-in threshold value may be defined as a quantity of credits, as a quantity of credits within a predetermined amount of time (e.g., thirty minutes), and/or as a quantity of credits within a single session of game play (e.g., by one player at one gaming machine 100). Any quantity of free play trigger conditions may be defined and stored in memory area 206.

As described above, in exemplary embodiments, controller 202 enables a base play bonus or a free play bonus, but not both. Alternatively, controller 202 may allow both a base play bonus and a free play bonus. In some embodiments, controller 202 determines 430 whether any free play trigger condition is satisfied even after determining 415 that a base play bonus trigger condition is satisfied.

Some embodiments facilitate providing a free play bonus to a group of gaming machines 100. In such embodiments, controller 202 may determine 430 that a free play trigger condition is satisfied by receiving (e.g., via communication interface 208) a free play notification from another gaming machine 100 and/or from a gaming server 302 (shown in FIG. 3), as described in more detail below. Further, controller 202 may transmit 435 a free play notification, indicating that the free play trigger condition is satisfied, to another gaming machine 100 and/or to a gaming server 302.

Controller 202 executes 440 one or more free plays based on a free play trigger condition being satisfied to create one or more free play outcomes. Each free play outcome is a winning free play outcome or a non-winning free play outcome. In exemplary embodiments, controller 202 determines whether each free play outcome is associated with a payout based on a free play pay table. The free play pay table may be the same as or different from the base play pay table. Free play outcomes associated with a payout are considered winning free play outcomes, whereas free play outcomes that are not associated with a payout are considered non-winning free play outcomes.

In some embodiments, controller 202 executes 410 base plays using a base play pay table and executes 440 free plays based using a free play pay table that is different from the base play pay table. For example, the base play table may associate payouts with one set of symbol combinations, and the free play table may associate payouts with a different set of symbol combinations. As another example, base play execution 410 and the corresponding base play pay table may be associated with a set of base play symbols, whereas free play execution 440 and the corresponding free play pay table may be associated a set of free play symbols. In addition, or alternative to, the free play pay table may include a proportion of winning play outcomes that is higher than the proportion of winning play outcomes in the base play pay table. Further, the free play pay table may include winning play outcomes that have an average payout that is lower than or higher than the average payout of winning play outcomes in the base play pay table.

In some embodiments, when any free play trigger condition is satisfied, controller 202 executes 440 a predetermined quantity (e.g., three, five, or seven) of free plays. In other embodiments, controller 202 determines 437 the quantity of free plays to execute 440 based on a minimum quantity of free plays, a maximum quantity of free plays, and a random number (e.g., generated using an RNG or a PNG). In the exemplary embodiment, controller 202 stores (e.g., in memory area 206) a weighted table that includes a plurality of free play quantities, each of which is associated with a weight. For example, quantities of 3, 4, 5, 6, and 7 may be associated with weights 97%, 93%, 87%, 75%, and 50%, respectively. Controller 202 generates a random number (e.g., between 0 and 1) and converts the random number into a percentage, such as by multiplying the random number by 100 and discarding the non-integral portion of the product (e.g., by calculating the product modulo 100). Such an embodiment enables a non-uniform occurrence rate for the available free play quantities. For example, as illustrated above, a quantity of three free plays may be selected more frequently as a quantity of four free plays is selected.

In the exemplary embodiment, controller 202 stores 445 winning and/or non-winning free play outcomes (e.g., in memory area 206). Stored free play outcomes may be later included in a report created by controller 202. For example, controller 202 may create an audit report that includes events (e.g., plays and play outcomes) that have occurred at gaming machine 100 over a period of time.

Controller 202 presents 420 any base play outcomes and also presents 425 any base play bonuses. If controller 202 has executed 440 free plays based on a free play retrigger condition being satisfied, as described below, it is possible that no base play outcomes or base play bonuses will exist for presentation 420 and 425.

When a winning free play outcome exists (i.e., at least one free play outcome is a winning free play outcome), controller 202 presents 450 (e.g., via presentation device 114) the winning free play outcomes. In the exemplary embodiment, non-winning free play outcomes are suppressed (e.g., not presented). If no free plays have been executed 440 (e.g., due to no free play trigger condition being satisfied), it follows that no winning free play outcomes exist.

In some embodiments, controller 202 presents 447 (e.g., via presentation device 114) a free play bonus mode when at least one free play outcome is a winning free play outcome and presents 450 the winning free play outcomes in the free play bonus mode. For example, the free play bonus mode may include a graphical distinction from the base play mode and/or a predetermined free play bonus sound. In the exemplary embodiment, controller 202 presents 447 the free play bonus mode by displaying a red screen (e.g., a red background) via presentation device 114. Free play information, such as symbols selected by controller 202 during execution 440 of a free play, may be overlaid on the red screen. In the exemplary embodiment, if no winning free play outcomes exist, controller 202 does not present 447 the free play bonus mode.

Some embodiments facilitate presenting 450 winning free play outcomes according to a predetermined sequence. In such embodiments, prior to presenting 450 winning free play outcomes, controller 202 sorts 448 the winning free play outcomes. For example, controller 202 may sort 448 the winning free play outcomes in a sequence that is based on the associated payouts (e.g., increasing payout amounts). In the exemplary embodiment, such sorting 448 is possible because free plays are executed 440 prior to presentation 450.

As described above, free plays may be executed 440 based on one or more free play trigger conditions being satisfied during base play. Optionally, free plays may be "retriggered" during free play. In some embodiments, after presentation 450 of any winning free play outcomes, controller 202 determines 455 whether one or more free play retrigger conditions are satisfied.

Free play retrigger conditions may be similar to free play trigger conditions. For example, free play retrigger conditions may be based on a random number, one or more predetermined symbols or symbol combinations, and/or the quantity of credits deposited in gaming machine 100 (also known as "coin-in"), as described above with reference to determining 430 whether a free play trigger condition is satisfied during base play. In addition, or alternative to, free play retrigger conditions may be specific to free play. For example, the probability of retrigger free play based on a random number may be lower or higher than the probability of triggering free play based on a random number. Similarly, a free play retrigger condition and a free play trigger condition may be associated with different coin-in threshold values. Further, free play retrigger symbol combinations may be different from free play trigger conditions.

When controller 202 determines 455 that a free play retrigger condition is satisfied, controller 202 proceeds as if a free play trigger condition was determined 430 to be satisfied. For example, controller 202 executes 440 one or more free plays, as described above, optionally transmitting 435 a free play notification and/or determining 437 the quantity of free plays. The quantity of free plays for a free play retrigger may be determined 437 using a set of available quantities and/or a weighted table that are different from those used in response to a free play trigger during base play.

In some embodiments, controller 202 determines 455 that a free play retrigger condition is satisfied based on first free play outcomes and then executes 440 one or more free plays based on the free play retrigger condition to create one or more second free play outcomes. If another retrigger occurs, controller 202 may create third free play outcomes, and so on.

Some embodiments facilitate game play among a plurality of gaming machines 100. For example, referring to FIGS. 3 and 4, gaming server 302 may be configured to determine 430 that a free play trigger condition is satisfied and to transmit 435 a free play notification to one or more gaming machines 100. The free play notification indicates that the free play trigger condition is satisfied.

Gaming server 302 may determine 430 that the free play trigger condition is satisfied as described above (e.g., based on a random number, a random time, a predetermined symbol combination, and/or coin-in). For example, gaming server 302 may generate a random number and determine 430 that the free play trigger condition is satisfied when the random number is within a predetermined range. As another example, gaming server 302 may calculate a total quantity of credits deposited (e.g., coin-in) among gaming machines 100 (e.g., a quantity of credits, a quantity of credits within a predetermined amount of time, and/or a quantity of credits within a single session of game play).

In addition, or alternative to, a gaming machine 100 may transmit 435 a free play notification to gaming server 302. Gaming server 302 determines 430 that a free play trigger condition is satisfied based on the received free play notification and transmits 435 (e.g., forwards) the free play trigger condition to one or more other gaming machines 100. In some embodiments, a gaming machine 100 transmits 435 a free play notification directly to at least one other gaming machine 100.

In such embodiments, gaming machines 100 receive a free play notification from gaming server 302 and/or from another gaming machine 100. Gaming machines 100 determine 430 that a free play trigger condition is satisfied based on the received free play notification, execute 440 free plays and present 450 winning free play outcomes, as described above, optionally in a free play bonus mode.

The quantity of free plays may be determined 437 by gaming server 302 and/or by one or more gaming machines 100 (e.g., based on a minimum quantity of free plays, a maximum quantity of free plays, and a random number). Further, where gaming server 302 determines 437 the quantity of free plays or received the quantity of free plays from a gaming machine 100, gaming server 302 may transmit the determined quantity to one or more other gaming machines 100, which execute 440 the determined quantity of free plays to create the determined quantity of free play outcomes.

Exemplary embodiments of systems and methods for presenting winning free play outcomes are described herein. The systems and methods are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming device in communication with a gaming server, the gaming device comprising:

a display device; and at least one processor configured to execute instructions stored on at least one memory, which, when executed by the at least one processor, cause the at least one processor to:

receive data associated with a game outcome from the gaming server;

determine that the game outcome satisfies a free play trigger condition for a free play bonus mode;

in response to determining that the game outcome satisfies the free play trigger condition, determine a plurality of free play outcomes for the free play bonus mode, and one of:

in response to determining that the plurality of free play outcomes satisfy a first condition, cause display of at least one winning free play outcome on the display device, wherein each at least one winning free play outcome is displayed with a colored screen overlaid upon a winning symbol combination, wherein a graphical representation of the free play bonus mode is distinguished by the colored screen, and wherein the colored screen is associated with and indicative of the free play bonus mode; or in response to determining that the plurality of free play outcomes satisfy a second condition, cause display of a game mode different from the free play bonus mode, wherein during the game mode different from the free play bonus mode, the colored screen is not displayed.

2. The gaming device of claim 1, wherein the game outcome is associated with a bingo game.

3. The gaming device of claim 1, wherein the gaming device comprises a bingo gaming machine.

4. The gaming device of claim 1, wherein the instructions, when executed by the at least one processor, further cause the at least one processor to determine the game outcome based upon the data.

5. The gaming device of claim 1, wherein when the colored screen is overlaid upon the winning symbol combination the free play bonus mode appears to be presented with a red foreground.

6. The gaming device of claim 1, wherein the instructions, when executed by the at least one processor, further cause the at least one processor to cause a sound associated with the free play bonus mode to be outputted in response to determining that the plurality of free play outcomes satisfy the first condition.

7. The gaming device of claim 1, wherein the instructions, when executed by the at least one processor, further cause the at least one processor to:

select a subset of free play outcomes to be displayed from the plurality of free play outcomes each having a payout associated therewith during the free play bonus mode;

sort the subset of free play outcomes into a sequence based on the payout associated with each free play outcome of the subset of free play outcomes; and cause the display device to display the subset of free play outcomes in the sequence during the free play bonus mode.

8. The gaming device of claim 1, wherein the instructions, when executed by the at least one processor, further cause the at least one processor to:

determine that a free play retrigger condition is satisfied based on the plurality of free play outcomes;

execute a plurality of additional free plays based on the free play retrigger condition being satisfied to generate second free play outcomes, the second free play outcomes including at least one non-winning free play outcome and at least one winning free play outcome;

suppress, during the free play bonus mode, the at least one non-winning free play outcome of the second free play outcomes, such that the non-winning free play outcome is not displayed; and cause display of the at least one winning free play outcome of the second free play outcomes via the display device and during the free play bonus mode.

9. The gaming device of claim 1, wherein the instructions, when executed by the at least one processor, further cause the at least one processor to, in response to determining that the plurality of free play outcomes satisfy the second condition, control the display device such that no indication is provided to a player that the free play bonus mode was initiated.

10. At least one non-transitory computer-readable storage medium with instructions stored thereon that, in response to execution by at least one processor, cause the at least one processor to:

receive data associated with a game outcome;

determine that the game outcome satisfies a free play trigger condition for a free play bonus mode;

based upon determining that the game outcome satisfies the free play trigger condition, determine a plurality of free play outcomes for the free play bonus mode, and one of:

based upon determining that the plurality of free play outcomes satisfy a first condition, cause display of at least one winning free play outcome on a display device, wherein each at least one winning free play outcome is displayed in combination with a colored screen, wherein a graphical representation of the free play bonus mode is distinguished by the colored screen, and wherein the colored screen is associated with and indicative of the free play bonus mode; or based upon determining that the plurality of free play outcomes satisfy a second condition, cause display of a game mode different from the free play bonus mode, wherein during the game mode different from the free play bonus mode, the colored screen is not displayed.

11. The at least one non-transitory computer-readable storage medium of claim 10, wherein the game outcome is associated with a bingo game.

12. The at least one non-transitory computer-readable storage medium of claim 10, wherein a bingo gaming machine comprises at least one of the at least one non-transitory computer-readable storage medium, the at least one processor, or the display device.

13. The at least one non-transitory computer-readable storage medium of claim 10, wherein the instructions, in response to execution by the at least one processor, further cause the at least one processor to determine the game outcome based upon the data.

14. The at least one non-transitory computer-readable storage medium of claim 10, wherein when the colored screen is displayed in combination with each at least one winning free play outcome, the free play bonus mode appears to be presented with a red foreground.

15. The at least one non-transitory computer-readable storage medium of claim 10, wherein the instructions, in response to execution by the at least one processor, further cause the at least one processor to determine the plurality of free play outcomes for the free play bonus mode based upon the data.

16. The at least one non-transitory computer-readable storage medium of claim 10, wherein the instructions, in response to execution by the at least one processor, further cause the at least one processor to cause a sound associated with the free play bonus mode to be outputted in response to determining that the plurality of free play outcomes satisfy the first condition.

17. The at least one non-transitory computer-readable storage medium of claim 10, wherein the instructions, in response to execution by the at least one processor, further cause the at least one processor to, based upon determining that the plurality of free play outcomes satisfy the second condition, control the display device such that no indication is provided to a player that the free play bonus mode was initiated.

18. A method of electronic gaming implemented by at least one processor in communication with at least one memory, the method comprising:

determining that a game outcome satisfies a free play trigger condition for a free play bonus mode;

in response to determining that the game outcome satisfies the free play trigger condition, determining a plurality of free play outcomes for the free play bonus mode, and one of:

in response to determining that the plurality of free play outcomes satisfy a first condition, transmitting first data to a gaming device that causes display of at least one winning free play outcome on a display device of the gaming device, wherein display of each at least one winning free play outcome comprises display of a colored screen and a winning symbol combination on the display device, wherein a graphical representation of the free play bonus mode is distinguished by the colored screen, and wherein the colored screen is associated with and indicative of the free play bonus mode; or in response to determining that the plurality of free play outcomes satisfy a second condition, transmitting second data to the gaming device that causes display of a game mode different from the free play bonus mode, wherein during the game mode different from the free play bonus mode, the colored screen is not displayed.

19. The method of claim 18, wherein the game outcome is associated with a bingo game.

20. The method of claim 18, wherein the gaming device comprises a bingo gaming machine.

* * * * *